United States Patent
Tiwari et al.

(10) Patent No.: US 7,972,900 B2
(45) Date of Patent: Jul. 5, 2011

(54) METHODS OF FABRICATING NANOSTRUCTURED ZNO ELECTRODES FOR EFFICIENT DYE SENSITIZED SOLAR CELLS

(75) Inventors: Ashutosh Tiwari, Sandy, UT (US); Michael R. Snure, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 0 days.

(21) Appl. No.: 12/761,884

(22) Filed: Apr. 16, 2010

(65) Prior Publication Data

US 2010/0203674 A1   Aug. 12, 2010

Related U.S. Application Data

(62) Division of application No. 11/695,393, filed on Apr. 2, 2007, now Pat. No. 7,804,149.

(51) Int. Cl.
*H01L 21/00* (2006.01)
*H01L 21/16* (2006.01)
(52) U.S. Cl. ........ 438/104; 977/723; 977/782; 977/811; 257/43; 257/E29.094
(58) Field of Classification Search ............ 257/43, 257/E29.094, 183.1, 184, 448, 459, 466, 257/614, 773, E31.015, E31.032; 438/104; 136/250, 265; 117/87; 977/723, 782, 811
See application file for complete search history.

(56) References Cited

U.S. PATENT DOCUMENTS

| 7,393,410 B2 | 7/2008 | Lee et al. |
| 2002/0139688 A1 | 10/2002 | Okura et al. |
| 2005/0009224 A1 | 1/2005 | Yang et al. |
| 2006/0083927 A1* | 4/2006 | Von Ehr, II .............. 428/408 |
| 2006/0162765 A1 | 7/2006 | Minoura et al. |
| 2007/0044835 A1 | 3/2007 | Yoshimoto et al. |
| 2007/0209576 A1 | 9/2007 | Sunkara et al. |
| 2007/0284573 A1* | 12/2007 | Tseng et al. ............... 257/43 |

FOREIGN PATENT DOCUMENTS

| JP | 07-142749 | 6/1995 |
| JP | 2002-009316 | 1/2002 |
| WO | WO 2005/122235 | 12/2005 |

OTHER PUBLICATIONS

Peng et al. Crystal Growth and Design 2006, 6, 1518.*
International Preliminary Report on Patentability for PCT/US2008/004082 mailed Oct. 15, 2009.
International Search Report and Written Opinion for PCT/US2008/004082 (May 14, 2009).
Yuan et al. Electrochimica Acta 51 (2006) 3632-3636.
Zhu et al. Journal of Materials Chemistry 2004, 14, 685.
Hosono et al. Electrocemica Acta 2004, 49, 2287.

* cited by examiner

*Primary Examiner* — Matthew C Landau
*Assistant Examiner* — Sonya D McCall Shepard
(74) *Attorney, Agent, or Firm* — Bell & Manning, LLC

(57) ABSTRACT

The present invention provides methods of forming metal oxide semiconductor nanostructures and, in particular, zinc oxide (ZnO) semiconductor nanostructures, possessing high surface area, plant-like morphologies on a variety of substrates. Optoelectronic devices, such as photovoltaic cells, incorporating the nanostructures are also provided.

20 Claims, 15 Drawing Sheets

US 7,972,900 B2

METHODS OF FABRICATING NANOSTRUCTURED ZNO ELECTRODES FOR EFFICIENT DYE SENSITIZED SOLAR CELLS

REFERENCE TO RELATED APPLICATION

This application is a divisional of U.S. patent application Ser. No. 11/695,393, filed Apr. 2, 2007, the disclosure of which is incorporated herein by reference in its entirety.

FIELD OF THE INVENTION

The present invention relates to metal oxide electrodes, photovoltaic cells incorporating the electrodes, and methods for making the electrodes. The present metal oxide electrodes possess plant-like morphology, may be made at low-temperatures on a variety of substrates, and exhibit improved conversion efficiency relative to more conventional electrodes.

BACKGROUND OF THE INVENTION

In recent years, research into nanotechnology and nanomanufacturing has been increasing. Of particular interest are nanostructured electrode materials, which may be used in unconventional energy sources such as dye sensitized solar cells, solid oxide fuel cells, and microbial fuel cells.

More than seventy percent of the total power consumed in the world is produced by burning fossil fuel. However, because of the continuously increasing cost of fossil fuel, and concerns about global warming, the importance of developing alternative energy sources has greatly increased. Several alternative sources of energy such as wind, solar, hydro, and nuclear have been explored over the last several decades. Among these unconventional energy sources, solar and nuclear sources are considered the most promising. Because the production of energy from nuclear sources requires building an extensive infrastructure, and has suffered from negative public perception, solar energy remains the most preferred and environmentally friendly alternative to conventional fossil energy sources.

Although interest in solar energy is increasing, solar energy is still not able to compete fully with fossil fuel energy sources because of a number of material challenges. For example, conventional silicon-based solar cells require high-purity, defect free silicon. The cost of producing such high-purity silicon is significant. Coupled with low energy conversion efficiency, the cost of power produced by these cells is still several times more than power produced by conventional energy sources. Because of these issues, the current major challenge in this field is to radically reduce the overall cost of delivered solar electricity by significantly lowering the cost of the cell and improving its energy conversion efficiency.

In this context, Dye Sensitized Solar Cells (DSSCs) may be a viable alternative to the more expensive first-generation inorganic solar cells, in terms of both efficiency and cost-effectiveness. DSSCs operate through a process that is similar in many respects to photosynthesis, the mechanism by which green plants derive chemical energy from sunlight. The DSSC uses an organic dye to absorb light energy in the visible region of the electromagnetic spectrum. This dye then "injects" electrons into the semiconductor base, which enhances electron collection and improves the photovoltage and photocurrent characteristics of the solar cell.

Until recently the most common DSSC platforms under investigation were based on electrodes consisting of sintered semiconducting nanoparticles (mostly $TiO_2$ or $ZnO$) coated with an organic dye. The dye molecules absorb light in the visible region of the electromagnetic spectrum and then "inject" electrons into the semiconductor electrode. Nanoparticle-based DSSCs rely on trap-limited diffusion through the semiconductor nanoparticles for the subsequent electron transport. This is a slow transport mechanism that limits device efficiency, especially at longer (less energetic) wavelengths, because recombination events become more likely. It is therefore desirable to develop other types of electrodes to overcome the problems associated with conventional DSSCs.

SUMMARY OF THE INVENTION

The present invention provides methods of forming metal oxide semiconductor nanostructures and, in particular zinc oxide (ZnO) semiconductor nanostructures, possessing high surface area, plant-like morphologies on a variety of substrates. The unique physical characteristics of the nanostructures make them particularly attractive for use as the electrodes in a variety of optoelectronic devices. In contrast to sintered nanoparticle-based optoelectronic devices, such as solar cells, the direct electrical pathways provided by the present nanostructures ensure the rapid collection of carriers generated throughout the material. As a result, the present nanostructures provide high energy conversion efficiencies in optoelectronics. In addition to providing unique electrode morphologies, the methods of the present invention use lower processing temperatures than other available methods.

In their most basic embodiment, the methods of the present invention involve forming a solution containing a dissolved metal oxide and a nanostructure growth compound, depositing a thin layer of the solution on the surface of a substrate, and treating the coated substrate with heat to induce the self-assembly of metal oxide nanostructures having plant-like morphologies on the surface of the substrate. The nanostructure growth compound is a compound, such as an amine, that induces nanostructure growth in a coating of the solution upon exposure to heat.

The basic method of forming metal oxide nanostructures on the surface of a substrate may be carried out in six steps. In a first step, a bulk metal oxide, such as ZnO, is dissolved in an acidic liquid medium to form a first solution. In a second step, a basic gas (e.g., $NH_3$) is passed through the first solution to form a second solution having a lower acidity than the first solution. In a third step, a nanostructure growth compound (e.g., $C_6H_{12}N_4$) is added to the second solution, preferably at an elevated temperature (e.g., about 80° C.), to form a third solution. In a fourth step, the third solution is refluxed at an elevated temperature to form a fourth solution comprising a homogeneous mixture. In a fifth step, the fourth solution is deposited onto the surface of a substrate to form a thinly coated substrate. The coated substrate is then allowed to dry. Finally, the coated substrate is treated with heat to induce the self-assembly of metal oxide nanostructures having plant-like morphology on the surface of the substrate. Although this heat treatment step may be carried out in an oven, it is desirably carried out using with a visible light source, such as a laser, which uniformly or selectively illuminates the coated substrate surface.

Once an initial layer of metal oxide semiconductor nanostructures are formed on the surface of the substrate, additional layers may be formed sequentially over underlying layers by repeating the method described above.

Optoelectronic devices incorporating the metal oxide nanostructures are also provided. These devices generally include a first electrode, a second electrode, a layer of metal oxide semiconductor nanostructures disposed between the first and second electrodes, and a charge transport medium (e.g., an electrolyte) disposed between the first and second electrodes. Photovoltaic cells and, more specifically, DSSCs, are a specific example of an optoelectronic device into which the present metal oxide nanostructures may be incorporated.

Further objects, features and advantages of the invention will be apparent from the following detailed description when taken in conjunction with the accompanying drawings.

DETAILED DESCRIPTION OF THE INVENTION

The present invention provides methods of forming metal oxide nanostructures having high surface areas and a possessing plant-like morphology on a variety of substrates. Examples of nanostructures having plant-like morphologies are shown in the SEM images of FIGS. 7-13. As can be seen from the SEM images, the phrase "plant-like morphology" covers a range of nanostructure morphologies. However, within this range nanostructures having "plant-like morphology" are all characterized by one or more growth centers having a plurality of projections extending radially there from along the surface of the substrate onto which they are coated, such that the projections are oriented parallel to and are in contact with the surface along their lengths ("radial surface projections").

Figure 8:
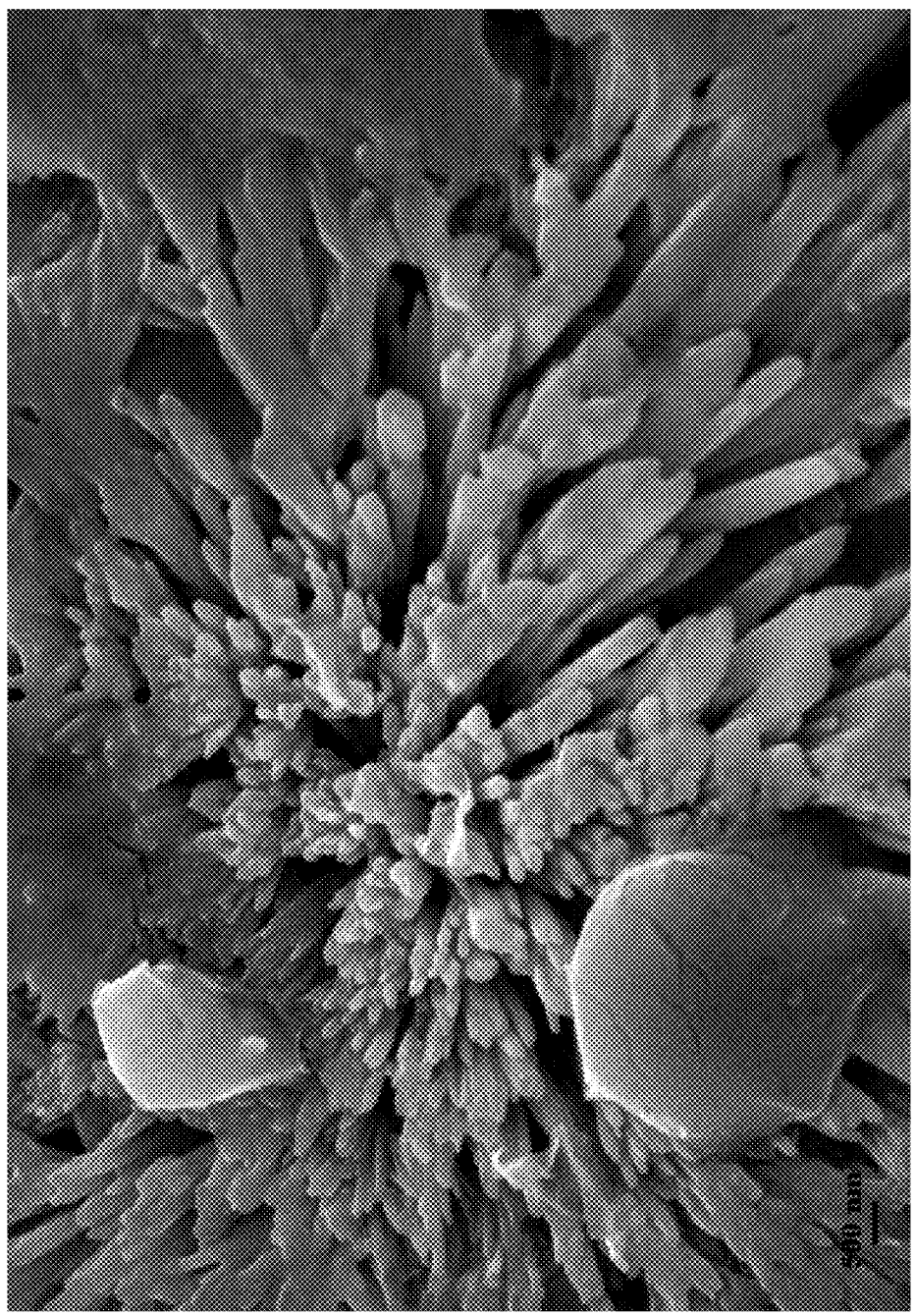
FIG. 8 shows an SEM image of ZnO nanostructures formed on a Si(111) substrate using uniform illumination.
Figure 11:
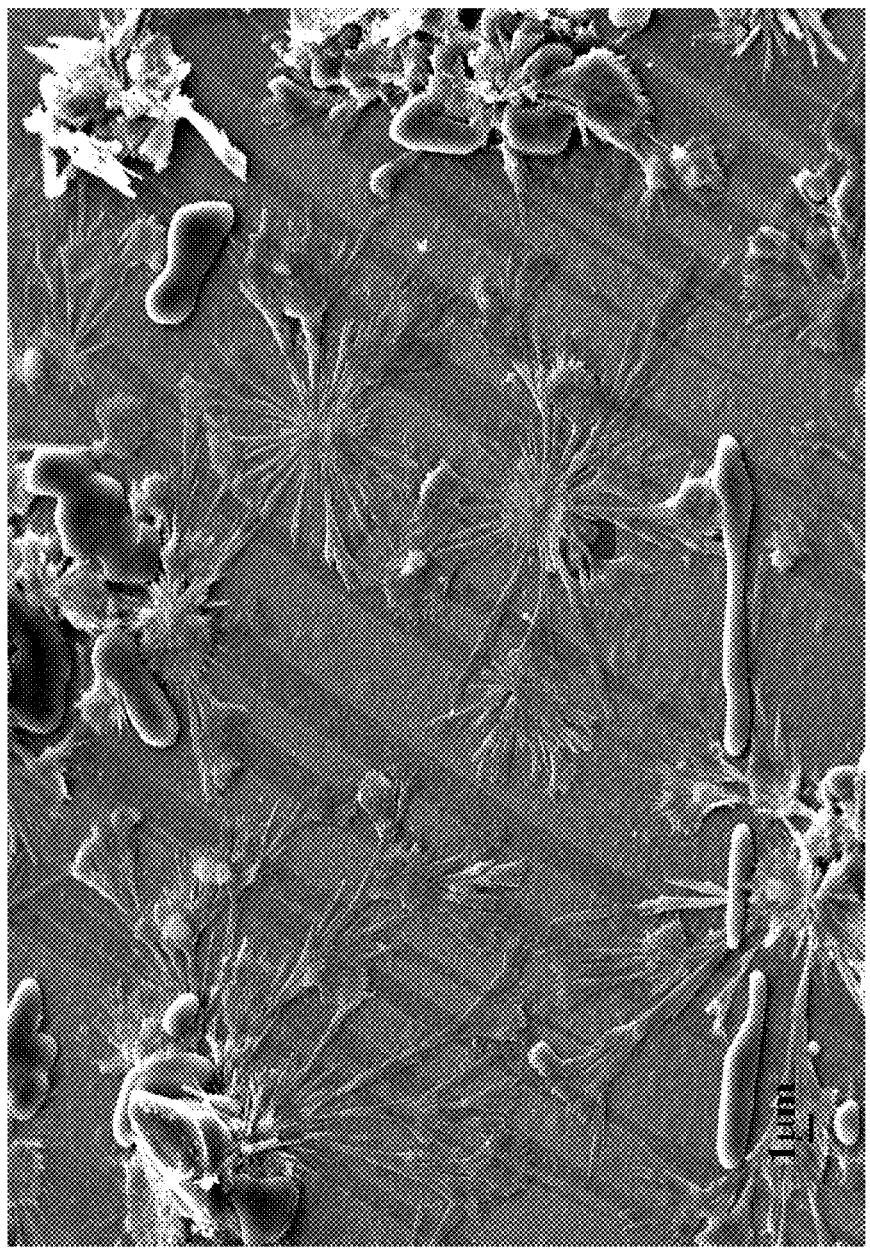
FIG. 11 shows an SEM image of ZnO nanostructures formed on an Si(100) substrate that had been previously coated with a thin layer of Au. The nanostructures were formed using selective illumination.
Figure 12:
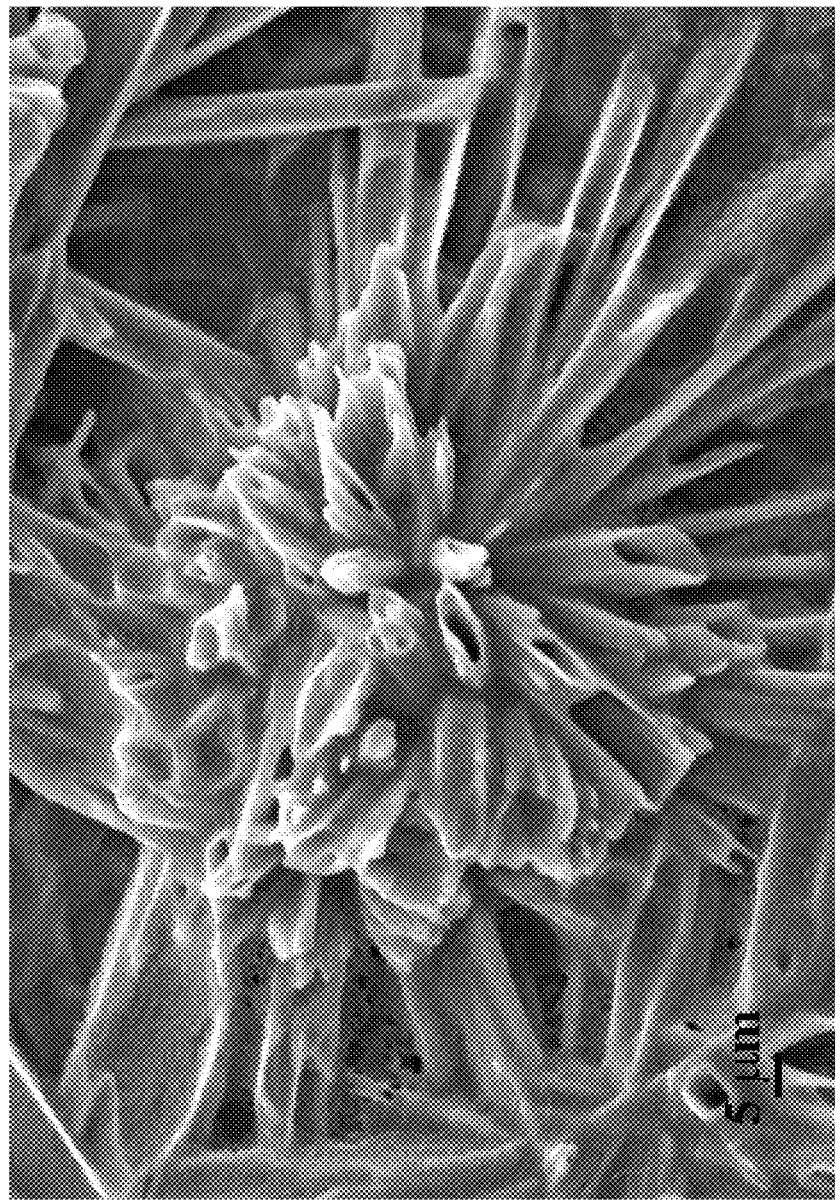
FIG. 12 shows an SEM image of ZnO nanostructures formed on a sapphire (0001) substrate that had been previously coated with a thin layer of Au. The nanostructures were formed using selective illumination.

In addition to the radial surface projections, the growth centers may have a plurality of projections extending away from the surface in a more perpendicular orientation (see, for example, FIGS. 8 and 12). The radial surface projections may extend uniformly or substantially uniformly or may extend intermittently around the entire growth center (i.e., around the 360° circumference of the growth center). The projections are typically long and fairly narrow with a polycrystalline structure having crystals with dimensions on the nanometer-scale (i.e., about 1 nm to about 100 nm). The projections generally have a length of at least 50 nm and a width of at least 10 nm. For example, the projections may have lengths of at least 100 nm, up to 500 nm, or greater, and widths of about 10 nm to about 5 μm (e.g., about 20 nm to about 500 nm). The projections may be fused at the base (i.e., where they come together at the growth center) and along a portion of their lengths. In some embodiments the nanostructures are distributed non-uniformly on the surface of the substrate. For example, growth centers or clusters of growth centers and their associated projections may be distributed randomly on the surface separated by areas of the substrate that are free of nanostructures (see, for example, FIG. 11). Although, in some such embodiments the growth centers and their associated projections may be bridged by one or more projections. Nanostructure growth methods using selective illumination (discussed below) are well-suited for the production of non-uniform layers of nanostructures on a substrate surface. The dimensions of each "nano-plant" (i.e., a growth center and its associated projections) may be quite large. For example, some embodiment of the nanoplants have diameters of about 1 to 100 μm. This includes embodiments where the nanoplants have diameter of about 2 to 80 μm and further includes embodiments where the nanoplants have diameters of about 5 to about 80 μm.

The present nanostructures may be distinguished from an array of nanowires grown on a surface, as described in U.S. Patent Application Publication No. 2005/0009224 by their structures and richness in morphology. For example, arrays of nanowires grown from a substrate are characterized in that the nanowires begin at the substrate and extend in a substantially vertical direction from the surface thereof. In such a structure, only the tips of the nanowires are exposed to light. In contrast, the present nanostructures grow along the surface of the substrate as well as upwardly therefrom, resulting in a greater available surface area and higher power conversion efficiencies.

For purposes of illustration, methods of making ZnO nanostructures are used to exemplify the invention in the discussion that follows. However, it should be understood that other types of metal oxide nanostructures, including tin oxide and titanium oxide nanostructures, may also be made according the present methods by replacing the ZnO with the appropriate metal oxide starting material.

The general method for forming the nanostructures involves three basic steps. In the first step a solution containing a dissolved metal oxide and a nanostructure growth compound is produced. This solution is then deposited as a thin layer on the surface of a substrate and, desirably, allowed to dry. At this point in the process the coating should remain free of nanoparticles and nanostructures. The coated substrate is then subjected to a heat treatment at a temperature and for a time sufficient to induce the precipitation and self-assembly of ZnO nanostructures on the surface of the substrate. The methods of the present invention may be repeated to form multiple layers of the ZnO nanostructures over the previously formed layers.

Figure 1:
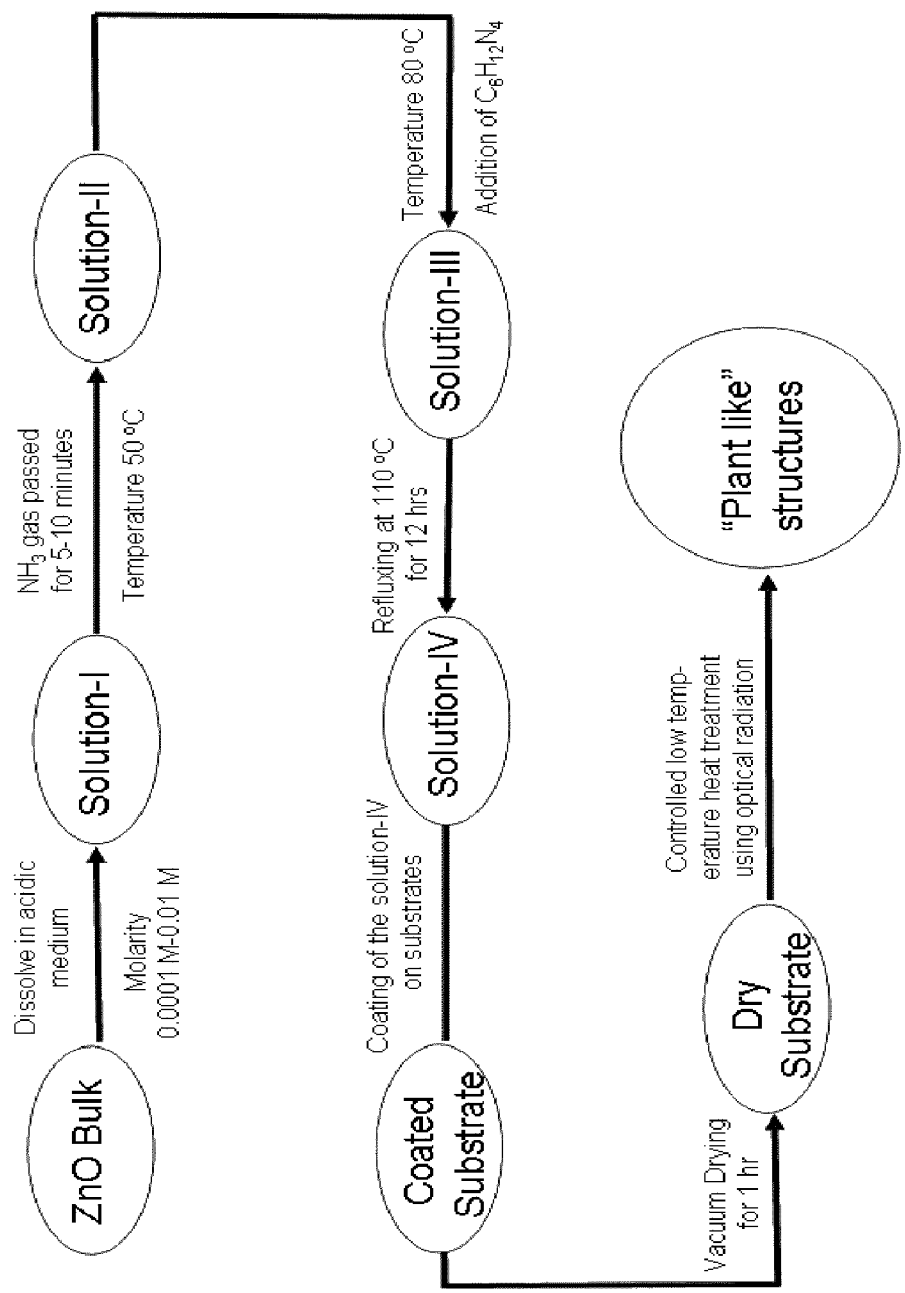
FIG. 1 is a flow diagram illustrating the formation of ZnO nanostructures on substrates according to the methods of the present invention.
Figure 2:
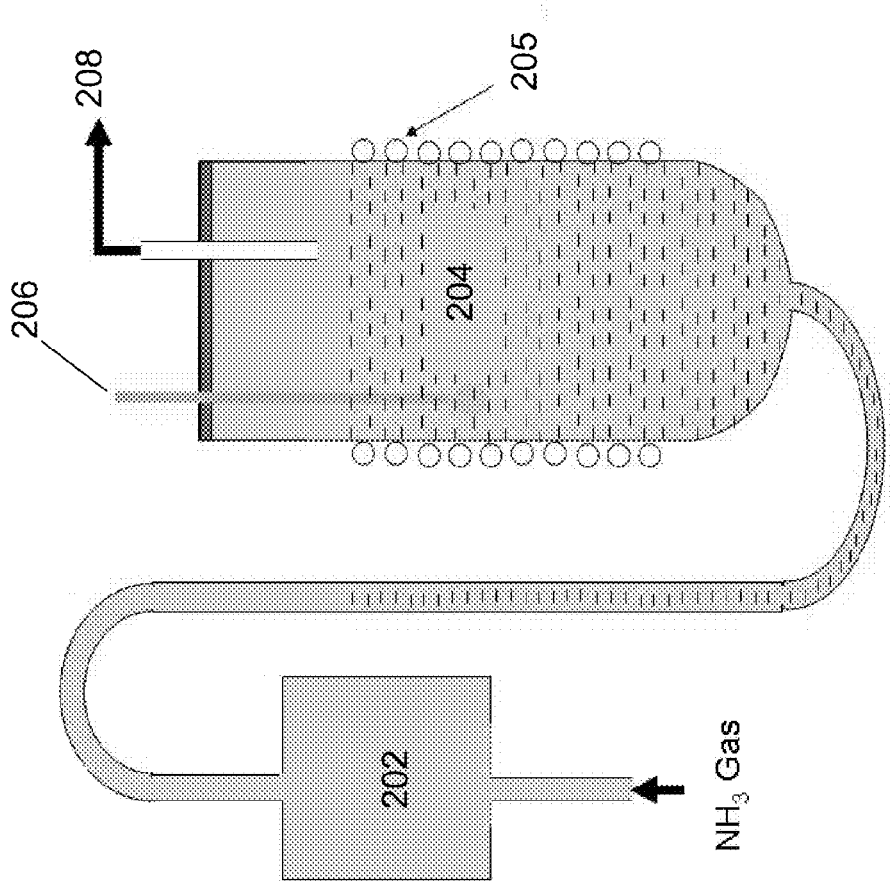
FIG. 2 is a schematic diagram of a reaction chamber that may be used to carry out some steps of the methods of the present invention.

The formation of the solution containing the metal oxide and the nanostructure growth compound may be carried out in multiple steps, as illustrated in FIG. 1. In a first step, bulk ZnO is dissolved in an acidic medium to form a first solution. The acidic medium may be formed from a variety of acids, including, but not limited to, concentrated nitric acid ($HNO_3$). In this step, the concentration of the ZnO in the first solution typically ranges from about 0.0001 M to about 0.01 M, although concentrations outside this range may be used. In a second step, a basic gas is passed through the first solution under constant temperature to form a second solution in order to reduce the acidity of the first solution. This second step may be carried out in a specially designed chamber as illustrated in FIG. 2. The chamber includes a flow meter 202 for controlling the flow of gas through the solution, a vessel 204 for containing the solution, a heating coil 205 (or other suitable heating means) for maintaining the desired temperature of the solution, a thermometer 206 for monitoring the temperature and an exhaust line 208 for releasing gas from the vessel. A variety of basic gases may be used in this step, including, but not limited to, ammonia ($NH_3$). The solution is exposed to the gas for a time and at a temperature sufficient to reduce the acidity of the solution to an acceptable level (e.g., to a pH value of about 5 to about 6). For example, the solution may be exposed to the gas for about 5 minutes to about 10 minutes at a temperature of about 25° C. to about 60° C., although times and temperatures outside these ranges may be employed. In some embodiments, the temperature is about 50° C.

In a third step, a nanostructure growth compound is added to the second solution, preferably at an elevated temperature, to form a third solution. The nanostructure growth compound is a compound that promotes nanostructure formation from the solution when the solution undergoes a heat treatment. Examples of nanostructures growth compounds include amines. Hexamethylene tetramine ($C_6H_{12}N_4$) is a specific example of a nanostructure grown compound that is well-suited for use in the present methods.

In a fourth step, the third solution is refluxed at an elevated temperature to form a fourth solution. The result is a homogenous solution of the dissolved ZnO and the nanostructure growth compound in which precipitation of the nanostructures has not yet begun.

Optionally, the methods may be adapted to produce doped nanostructures by introducing other elements in the ZnO lattice. Doping may be carried out by adding a dopant precursor molecule (typically a metal-containing salt or an organometallic compound) to the solution containing the dissolved metal oxide. For example, the ZnO nanostructures may be doped with one or more transition metal (TM) elements such as Co, Ni and Mn. TM-doped ZnO is very useful in Spintronics as a Diluted Magnetic Semiconductor.

The solution is then deposited onto the surface of a substrate and allowed to dry. For example, the coated substrates may be kept under vacuum for about 1 hour. The coating may be exposed to heat in order to expedite the drying process, however the temperature of the solution should remain sufficiently low during this stage to prevent the formation of ZnO nanostructures. The substrate may be coated using well-known coating techniques, such as spin-coating and dip-coating. The thickness of the coating layer may vary, but is generally about 20 to 200 nm thick. A variety of substrates may be used, including, but not limited to, glass, silica, and sapphire substrates. In some embodiments, the substrates may be coated with a thin layer of metal prior to being coated with the solution. A variety of metals may be used, including, but not limited to, gold (Au). Other suitable substrates include, but are not limited to, semiconductors such as silicon and gallium arsenide, metals such as titanium foil, metal oxides such as titanium oxide, tin oxide, zinc oxide, and indium tin oxide, and polymers such as semiconducting polymers and insulating polymers.

In order to induce the formation and self-assembly of ZnO nanostructures, the coated substrate is exposed to heat. In some embodiments, the heat treatment comprises exposing the coated substrate to an elevated temperature. For example, the coated substrate may be placed in an oven maintained at a temperature of about 50° C. to about 175° C. (e.g., about 100° C. to about 170° C.). In other embodiments, the heat treatment comprises illuminating the coated substrate with visible light having sufficient intensity to increase the temperature of the layer and induce nanostructure formation. For example, the light may increase the temperature of the layer to about 50° C. to about 175° C. (e.g., about 100° C. to about 170° C.). In the case of uniform illumination, an incandescent light bulb may be used for optical illumination, desirably with a fluence in the range of 5-25 Watt/cm$^2$. In the case of selective illumination, a helium-neon (He—Ne) laser source may be used, desirably with fluence in the range of 25-150 Watt/cm$^2$. Upon exposure of the coated substrate to light or ambient heat, the temperature of the coated substrate increases, facilitating the crystallization and self-assembly of ZnO into nanostructures having plant-like morphologies. Ultimately, the physical characteristics of the ZnO nanostructures formed during heat treatment depends upon the underlying substrate material, the concentrations of starting solutions, and temperatures used during the heat treatment step.

Figure 3:
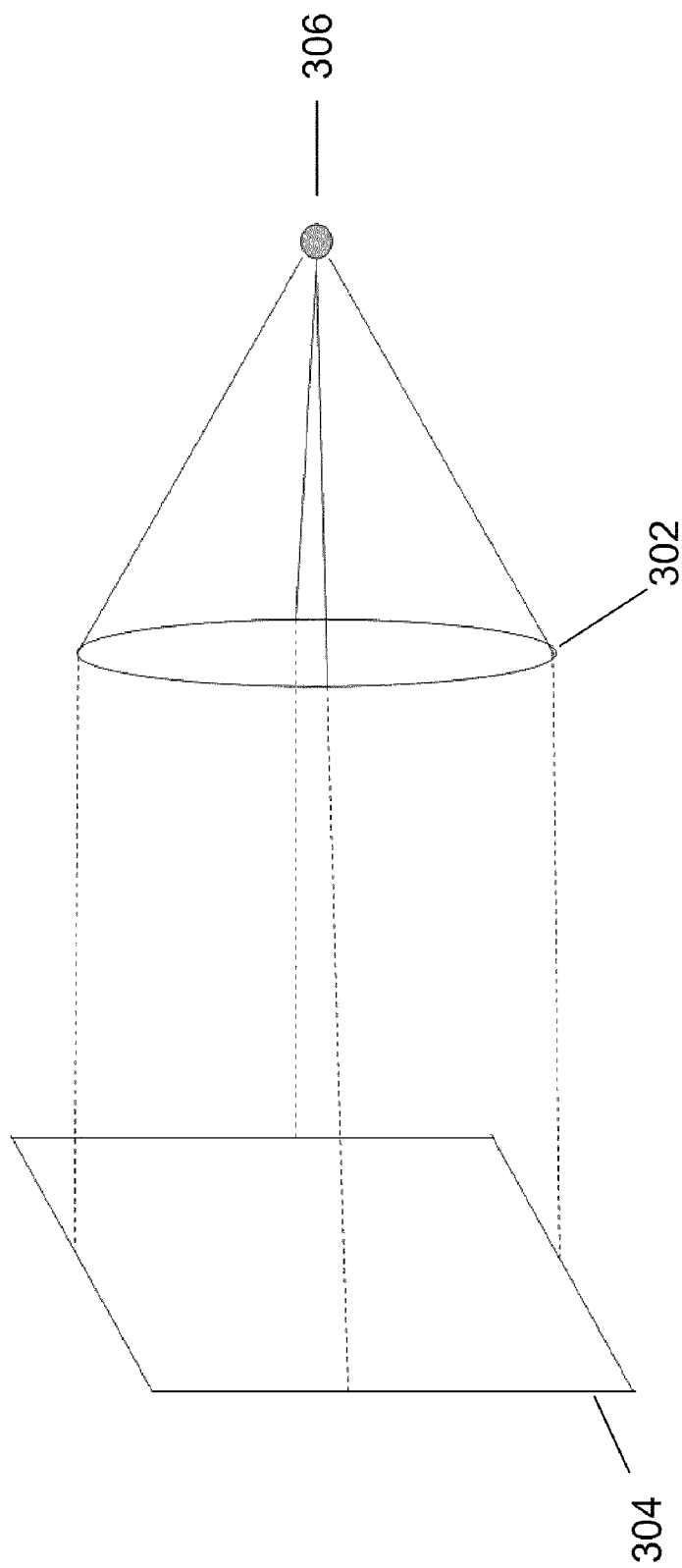
FIG. 3 is a schematic diagram of an apparatus that may be used to uniformly illuminate coated substrates with light.
Figure 4:
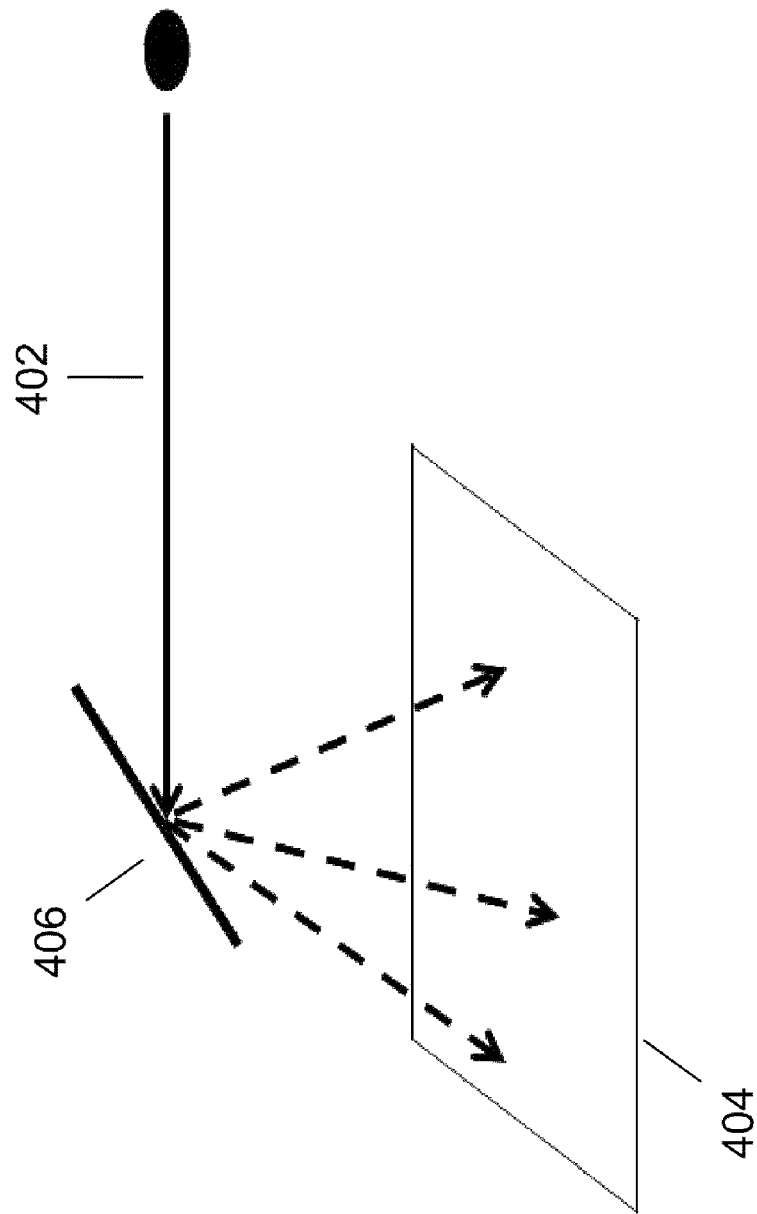
FIG. 4 is a schematic diagram of a laser beam rastering apparatus that may be used to selectively illuminate coated substrates with light.
Figure 5:
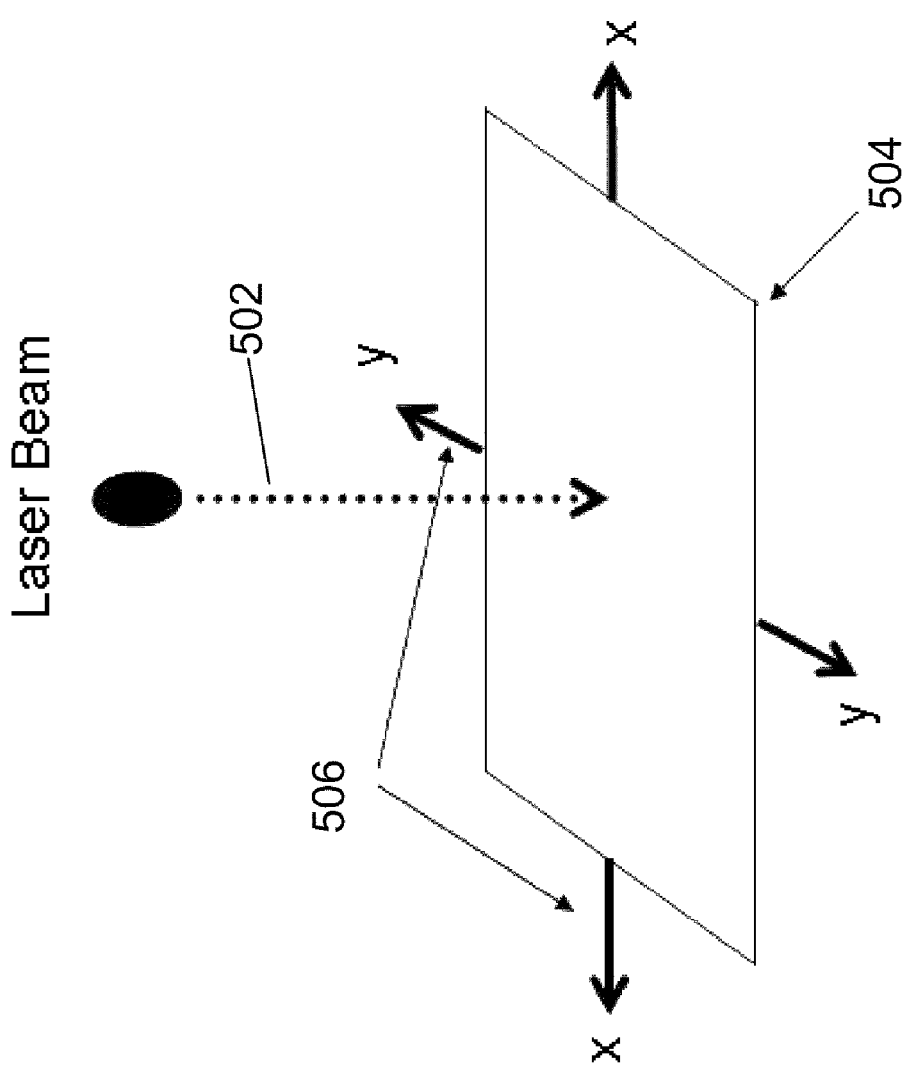
FIG. 5 is a schematic diagram of another apparatus that may be used to selectively illuminate coated substrates with light.

When visible light is used to induce nanostructure formation, the coated substrate may be uniformly illuminated with light. For example, as shown in FIG. 3, a focusing lens 302 may be used to uniformly illuminate the coated substrate 304 with light generated from a variety of light sources 306. In such an embodiment, the temperature rise of the coated substrate is uniform throughout the substrate. Alternatively, the coated substrate may be selectively and/or non-uniformly illuminated with light. Selective illumination refers to a process wherein only a portion of the coated substrate is illuminated with light at any one time to provide an area of local heating and nanostructure formation. Non-uniform illumination refers to a process wherein certain regions of the coated substrate are illuminated while other regions are not illuminated, or are illuminated for different times and/or at different light intensities. The result of the non-uniform illumination is the formation of a non-uniform distribution of nanostructures on the surface of the substrate. In one such embodiment, the coated substrate is illuminated with a laser beam. Different areas of the coated substrate may be illuminated by rastering the laser beam over the surface of the coated substrate or by moving the coated substrate under a fixed laser beam. For example, using the device of FIG. 4, the laser beam 402 may be rastered over the surface of the coated substrate 404 by means of a rotating mirror 406 equipped with a computer controlled motor. Alternatively, as shown in FIG. 5, the laser beam 502 may remain fixed and the coated substrate 504 may be moved in the x-y plane by means of a moveable stage 506. In these embodiments, the temperature rise of the coated substrate is confined to the area of illumination. Furthermore, different temperatures may be achieved by adjusting the intensity of the laser beam. By adjusting the intensity of the beam as well as the placement of the beam (or placement of the coated substrate), specific types of ZnO nanostructures may be formed at specific locations on the coated substrate.

Using the present methods, multiple layers of ZnO nanostructures may be formed over previously formed layers of ZnO nanostructures to form consecutive layers on a single substrate. In some embodiments, the entire nanostructure formation process may take place in a single deposition apparatus without the need for additional processing steps between each deposition. In addition, the entire process may be carried out at temperatures of 170° C. or lower (e.g., 150° C. or lower).

Once the nanostructures have been formed on a substrate, an optoelectronic device such as a photovoltaic cell may be formed. For the purposes of this disclosure, an optoelectronic device is any device that produces light or converts light into electricity. Examples of such devices include photovoltaic cells (including solar cells), photodetectors, photodiodes, and light-emitting diodes. Specific examples of photovoltaic cells include, DSSCs, organic-inorganic hybrid photovoltaic devices, and solid-state sensitized solar cells. Typically, these optoelectronic devices include a first electrode, a second electrode, at least one layer of metal oxide nanostructures having plant-like morphologies disposed between the first and second electrodes, and a charge transport medium disposed between the first and second electrodes.

Figure 6:
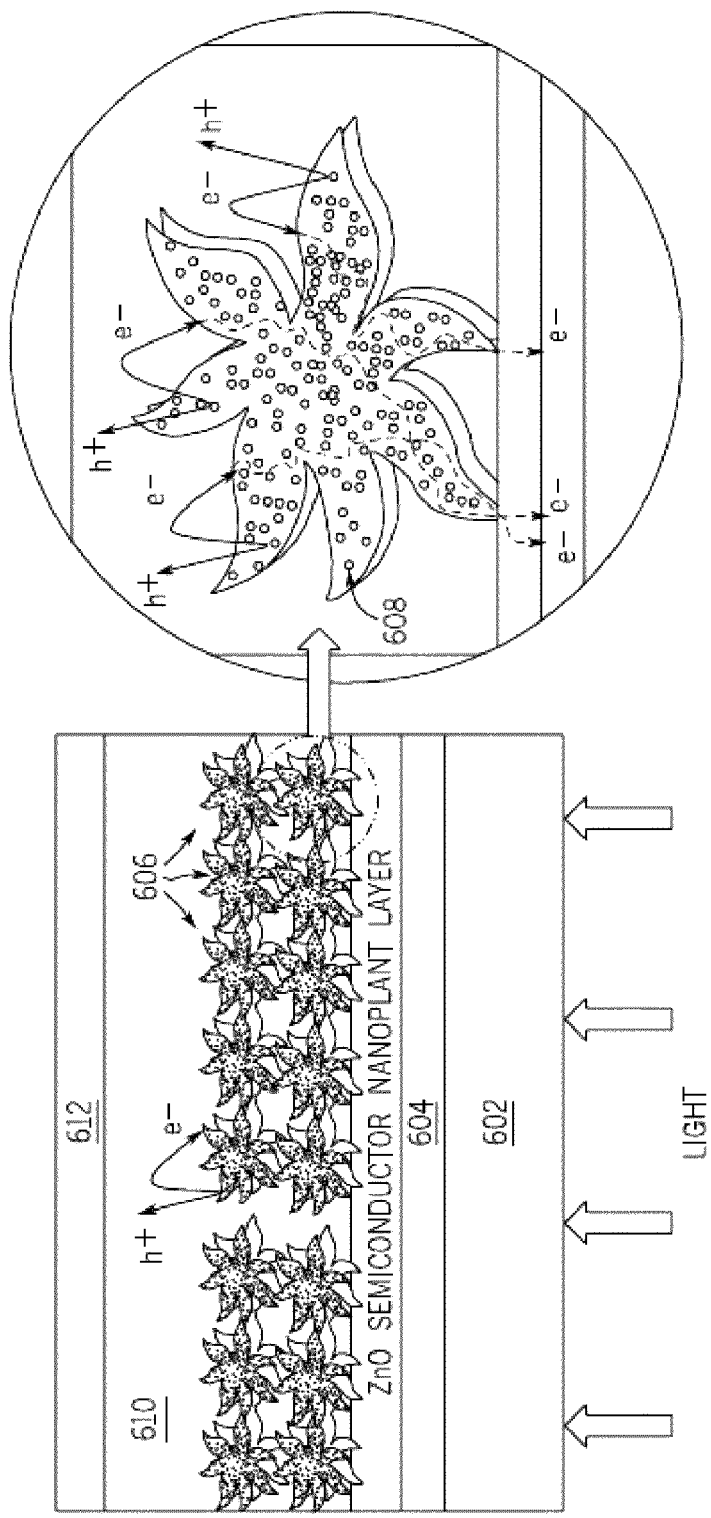
FIG. 6 is a schematic diagram of a DSSC including an electrode comprising the ZnO nanostructures formed according to the methods of the present invention.

FIG. 6 shows the basic structure of a DSSC made in accordance with the present invention. The cell comprises (i) a transparent substrate 602, (ii) a transparent conducting oxide coating (TCO) 604, (iii) a thin layer of ZnO comprising ZnO nanostructures 606, (iv) organic dye coating on the leaf-like projections of the ZnO nanostructures 608, (v) electrolyte 610 and (vi) a counter electrode 612. Indium tin oxide (ITO) may be used as the transparent conducting coating. Unlike most TCOs, ITO does not require high crystal quality to be conductive. Therefore, a lower processing temperature (<100° C.) may be used. Typically, the dye is present as a monolayer of dye molecules on the nanostructures. Suitable dyes are known and commercially available. These include ruthenium based dyes including [(CN)(bpy)$_2$Ru—CN—Ru(d-cbpy)$_2$-NCRu(bpy)$_2$], [Ru(4,4-bis(carboxy)-bpy)$_2$(NCS)$_2$] and [Ru(2,2',2''-(COOH)$_3$-terpy)(NCS)$_3$]. The dyes may be applied to the ZnO nanostructures by spray-coating. Iodine and Cu(SCN) are examples of suitable liquid and solid electrolytes, respectively.

The low-temperature formation of ZnO semiconductor nanostructures possessing plant-like morphology on a variety of substrate surfaces is further illustrated by the following non-limiting examples.

EXAMPLES

Materials and Methods: The metal oxide nanostructures in each of the examples below were made according to the method illustrated in FIG. 1. The preparation of the fourth solution (i.e., the solution that was coated on the substrate surfaces) was carried out as follows. The acidic liquid medium used to dissolve the ZnO was nitric acid; NH$_3$ gas was passed through the solution for 5-10 minutes at a temperature of 50° C.; C$_6$H$_{12}$N$_4$ at a concentration of about 0.01 M was used as the nanostructure growth compound and was added at a temperature of about 80° C.; and refluxing was carried out at about 110° C. for 12 hours.

Example 1

Formation of ZnO Nanostructures on Glass

Figure 7:
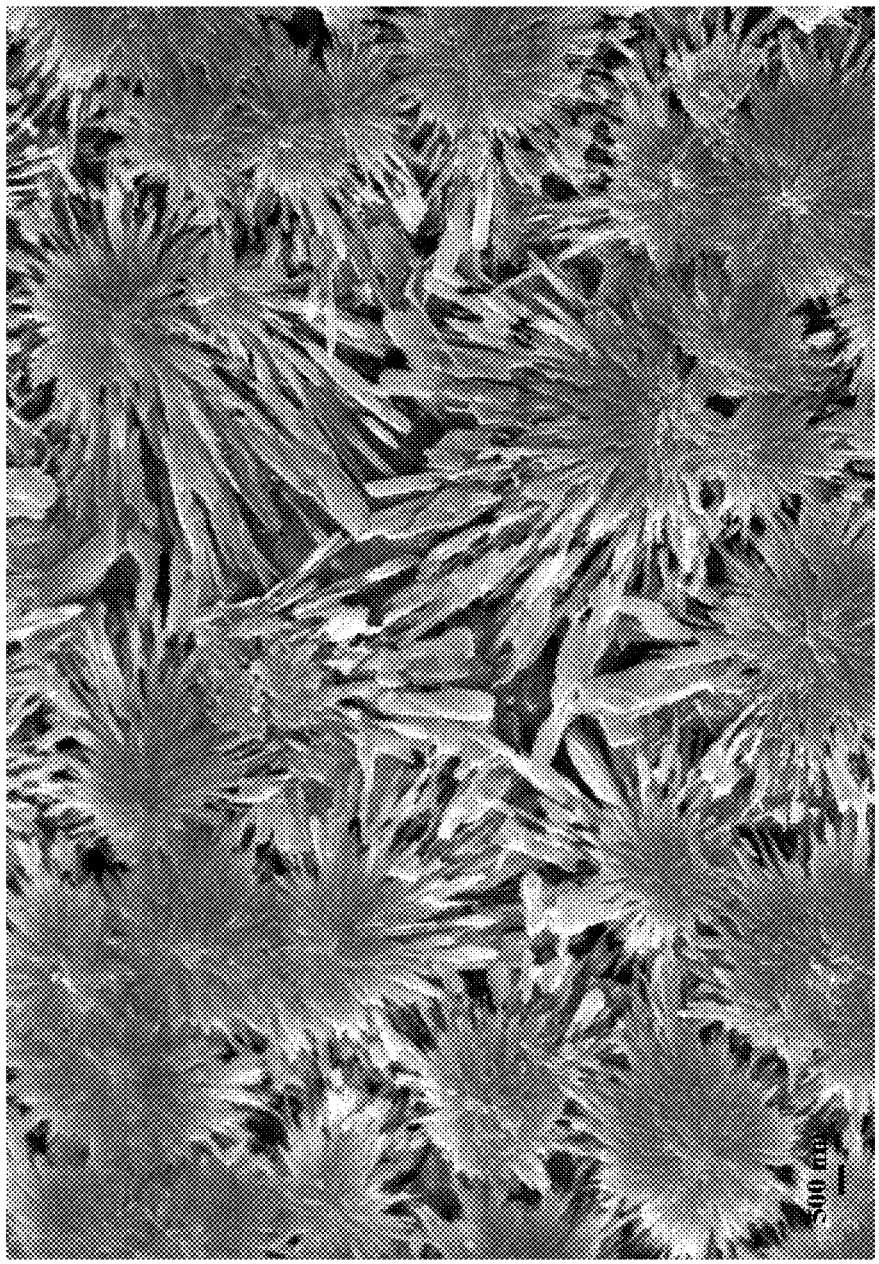
FIG. 7 shows a scanning electron microscope ("SEM") image of ZnO nanostructures formed on a glass substrate using uniform illumination.

About 10 μL of solution-IV (see FIG. 1) having [ZnO]= 0.001 M was spin-coated onto a 1-cm$^2$ glass substrate. The coated substrate was uniformly illuminated using the arrangement shown in FIG. 3 with an incandescent light bulb light source. The optical fluence was 10 Watt/cm$^2$, and the time of illumination was 20 minutes. The local temperature attained at the top of the substrate was 170° C. A scanning electron microscope (SEM) image of the ZnO nanostructures on glass is shown in FIG. 7.

Example 2

Formation of ZnO Nanostructures on Si(111)

About 10 μL of solution-IV (see FIG. 1) having [ZnO]= 0.01 M was spin-coated onto a 1 cm$^2$ Si(111) substrate. The coated substrate was uniformly illuminated using the arrangement shown in FIG. 3 with an incandescent light bulb light source. The optical fluence was 14 Watt/cm$^2$, and the time of illumination was 20 minutes. The local temperature attained at the top of the substrate was 150° C. FIG. 8 shows an SEM image of the resulting ZnO nanostructures.

Example 3

Formation of ZnO Nanostructures on Sapphire (0001)

Figure 9:
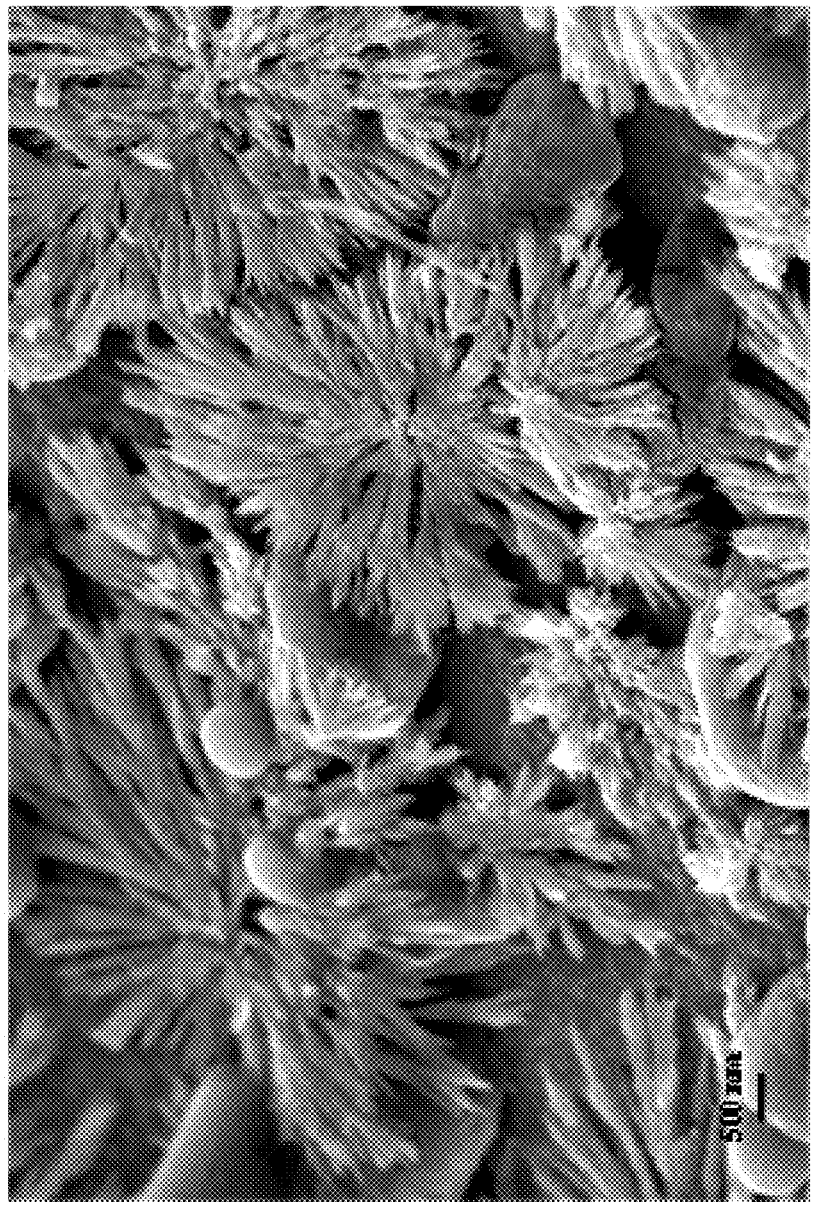
FIG. 9 shows an SEM image of ZnO nanostructures formed on a sapphire (0001) substrate using uniform illumination.

About 10 μL of solution-IV (see FIG. 1) having [ZnO]= 0.0005 M was spin-coated onto a 1-cm$^2$ sapphire (0001) substrate. The coated substrate was uniformly illuminated using the arrangement shown in FIG. 3 with an incandescent light bulb light source. The optical fluence was 16 Watt/cm$^2$, and the time of illumination was 20 minutes. The local temperature attained at the top of the substrate was 170° C. FIG. 9 shows an SEM image of the resulting ZnO nanostructures.

Example 4

Formation of ZnO Nanostructures on Fused Silica

Figure 10:
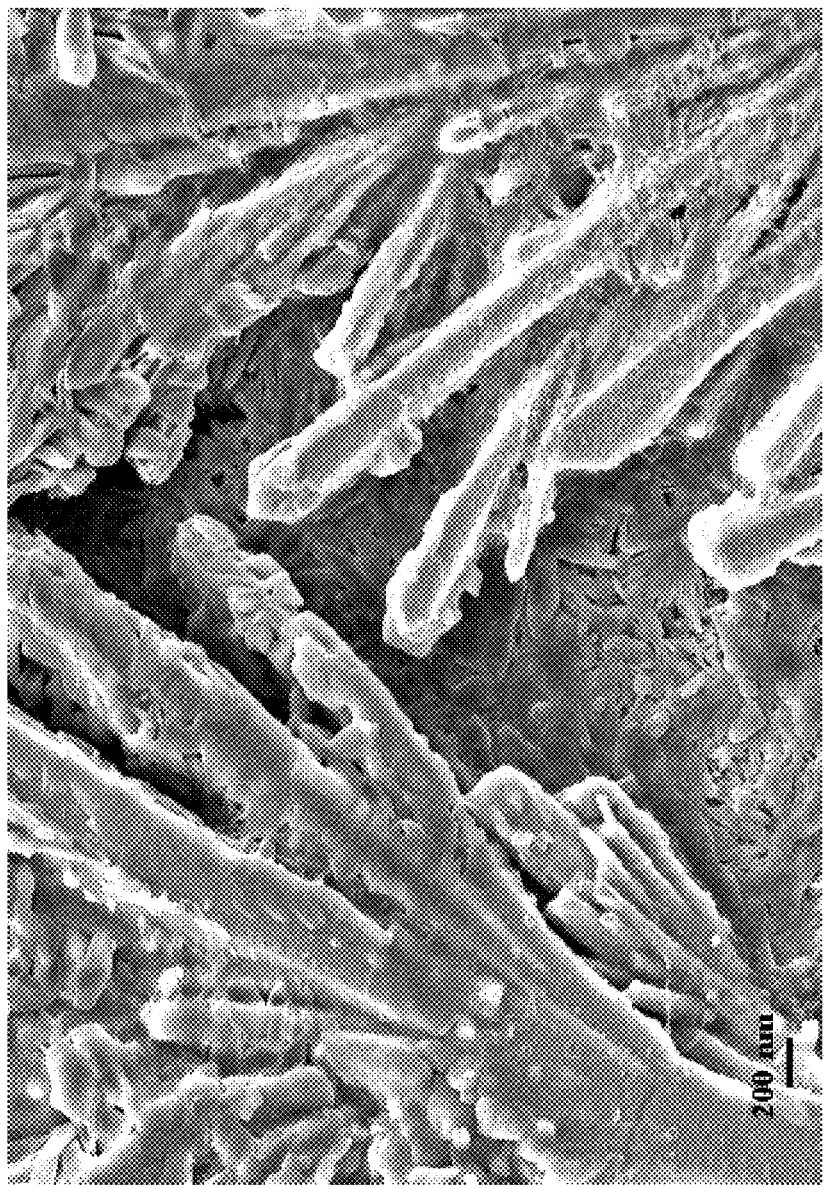
FIG. 10 shows an SEM image of ZnO nanostructures formed on a fused silica substrate using uniform illumination.

About 10 μL of solution-IV (see FIG. 1) having [ZnO]= 0.01 M was spin-coated onto a 1-cm$^2$ fused silica substrate. The coated substrate was uniformly illuminated using the arrangement shown in FIG. 3 with an incandescent light bulb light source. The optical fluence was 10 Watt/cm$^2$, and the time of illumination was 20 minutes. The local temperature attained at the top of the substrate was 120° C. FIG. 10 shows an SEM image of the resulting ZnO nanostructures.

Example 5

Formation of ZnO Nanostructures on Au-Coated Si(100)

About 10 μL of solution-IV (see FIG. 1) having [ZnO]= 0.0001 M was spin-coated onto a 1-cm$^2$ Si(100) substrate that had been previously coated with a thin layer of Au. The coated substrate was selectively illuminated using the arrangement shown in FIG. 5 with an He—Ne laser light source. The diameter of the laser beam was 10 μm and the optical fluence was 100 Watt/cm$^2$. The beam was focused at different locations on the surface of the coated substrate for 5-10 minutes at each location. FIG. 11 shows an SEM image of the resulting ZnO nanostructures.

Example 6

Formation of ZnO Nanostructures on Au-Coated Sapphire (0001)

Figure 15:
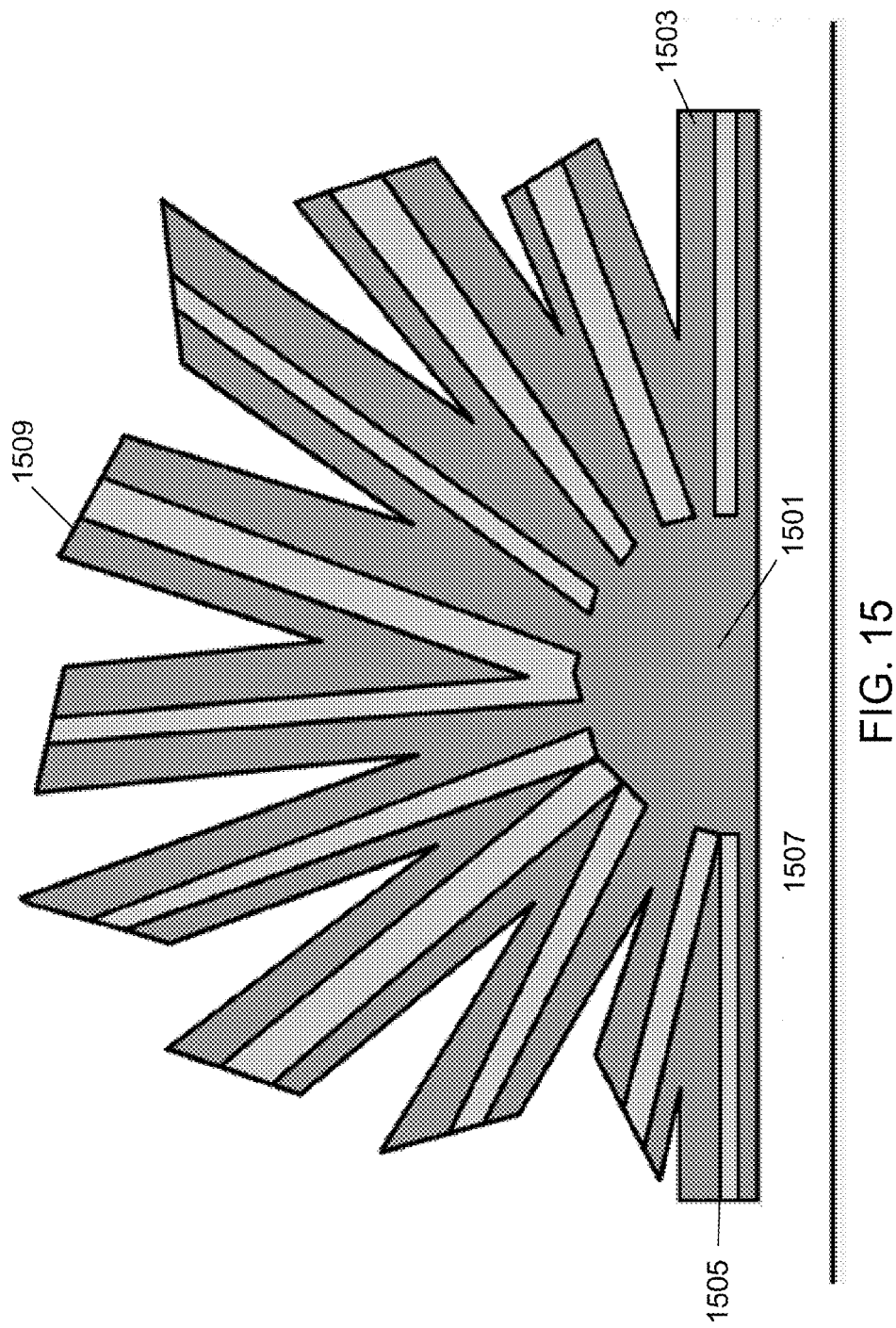
FIG. 15 provides a schematic illustration of a cross-section of a nanostructure of FIG. 12.

About 10 μL of solution-IV (see FIG. 1) having [ZnO]= 0.01 M was spin-coated onto a 1-cm² sapphire (0001) substrate that had been previously coated with a thin layer of Au. The coated substrate was selectively illuminated using the arrangement shown in FIG. 4 with an He—Ne laser light source. The diameter of the laser beam was 50 μm and the optical fluence was 40 Watt/cm². The beam was focused at different locations on the surface of the coated substrate for 10-15 minutes at each location. FIG. 12 shows an SEM image of the resulting ZnO nanostructures. FIG. 15 provides a schematic illustration of a cross-section of a nanostructure of FIG. 12. As shown in FIG. 15, the nanostructure includes a growth center 1501, having a plurality of projections 1503, 1505 extending radially therefrom along the surface of the substrate 1507. These projections are oriented parallel to and are in contact with the surface along their lengths. The growth center also has a projection 1509 extending radially therefrom and is oriented such that an angle between the surface of the substrate and the longitudinal axis of the at least one projection is greater than zero.

Example 7

Formation of Co-Doped ZnO Nanostructures on Si(100)

Figure 13:
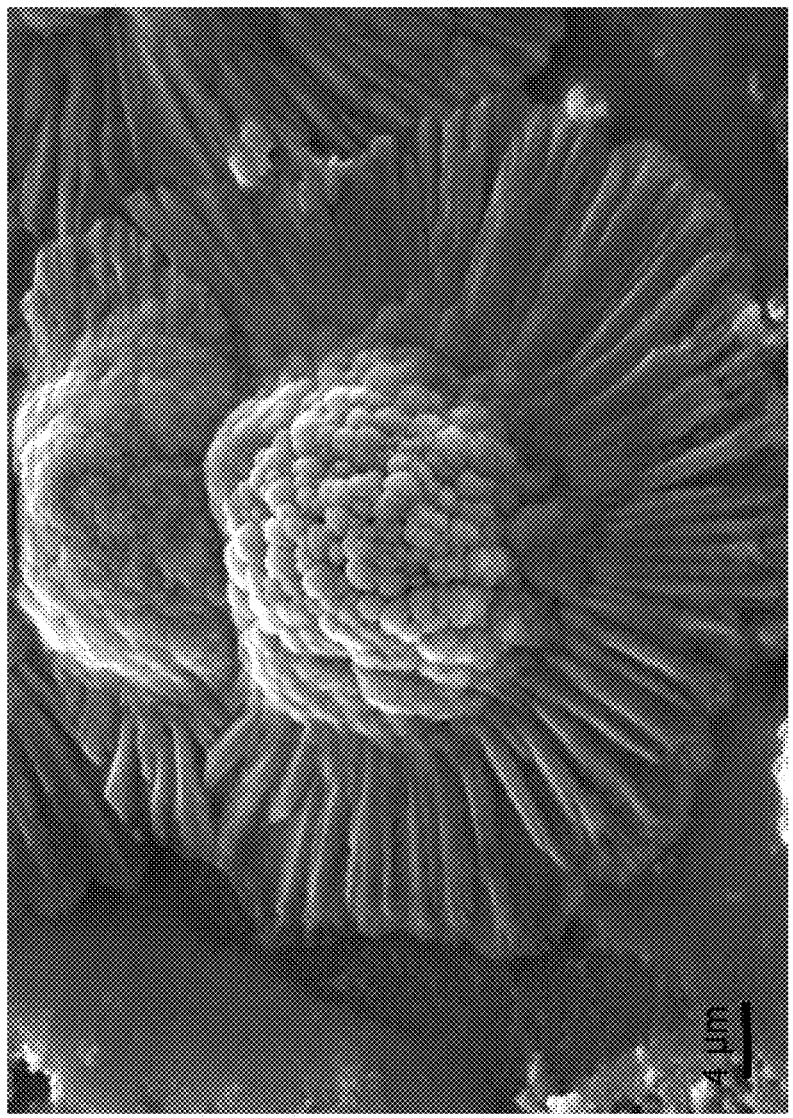
FIG. 13 shows an SEM image of Co-doped ZnO nanostructures formed on a Si(100) substrate using two rounds of selective illumination.

About 10 μL of solution-IV (see FIG. 1) having [ZnO]= 0.01 M and [Co(NO$_3$)$_2$].6H$_2$O=0.0005 M was spin-coated onto a 1 cm² Si(111) substrate. The coated substrate was selectively illuminated in two steps using the arrangement shown in FIG. 4. First, the coated substrate was selectively illuminated with an He—Ne laser with a diameter of 50 μm at an optical fluence of 50 Watt/cm² for 10 minutes. Second, the coated substrate was selectively illumination with a laser beam of a diameter of 20 μm at an optical fluence of 100 Watt/cm² for 5 minutes. An SEM image of the Co-doped ZnO nanostructures on Si(100) is shown in FIG. 13.

Example 8

Formation of a DSSC Comprising ZnO Nanostructures

Figure 14:
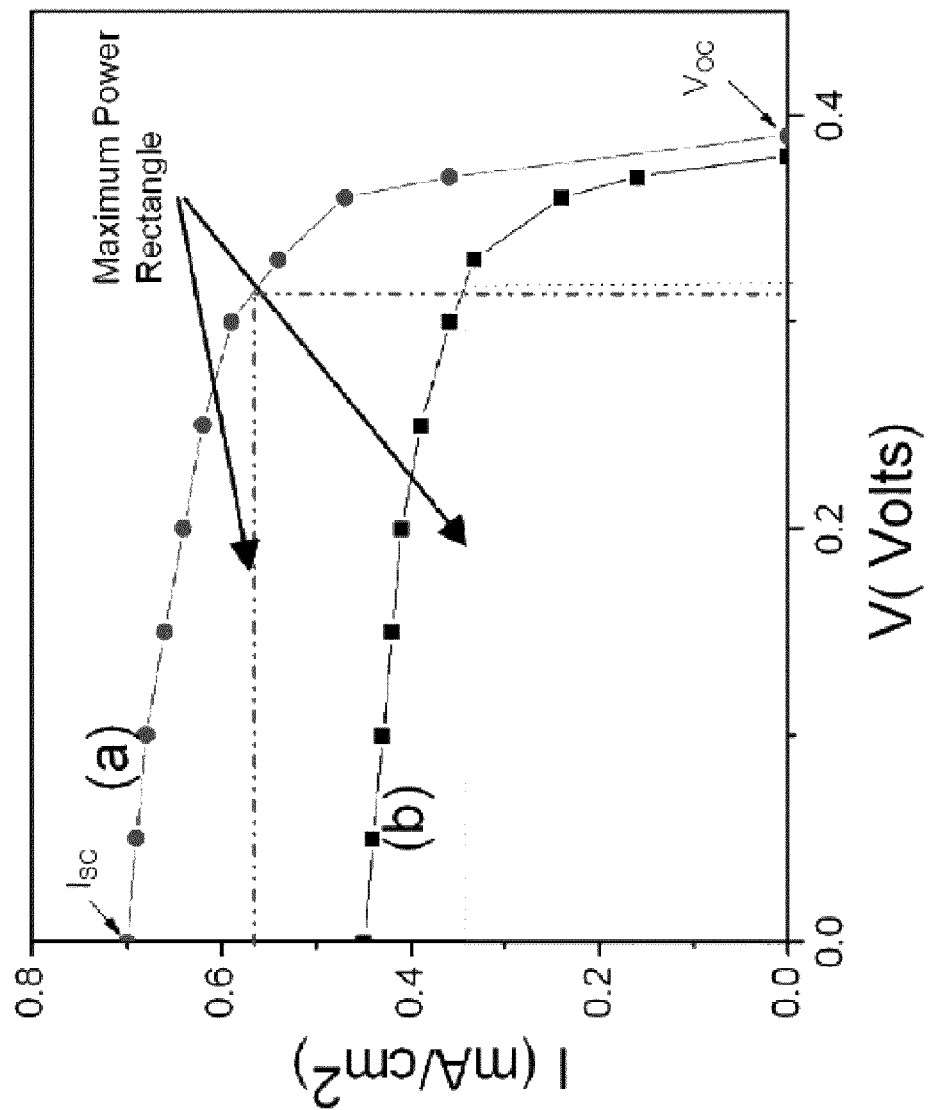
FIG. 14 illustrates the photocurrent-voltage characteristics for DSSC solar cells based on (a) ZnO nanostructures formed according to the methods of the present invention and (b) sintered ZnO nanoparticles.

FIG. 14 shows the photocurrent-voltage characteristics for DSSC solar cells based on (a) ZnO nanostructures prepared according to the methods disclosed herein and (b) sintered ZnO nanoparticles. Both cells were prepared and tested under the identical conditions. These were fabricated on glass substrates coated with a conducting ITO coating. In cell 'a' a thin layer of ZnO nanoplants was used as the electrode, while in cell 'b' a layer of conventional sintered ZnO nanoparticles was used. Dye sensitization of the nanostructured electrodes was carried out by soaking the film in an ethanol solution of a ruthenium complex, cis-bis(4,4-dicarboxy-2,2'-bipyridine)-bis-(isothiocyanato)-ruthenium(II). The dye-sensitized ZnO electrode, thus obtained, was assembled to form the complete cell. For this, the two electrodes were separated by a 25-μm-thick hot-melt ring and sealed up by heating. Space between the two electrodes was filled with the liquid potassium iodide electrolyte. The rectangle represents the maximum power output obtainable from each cell. The cell's power output is given by the equation: $P_{out}=FF \times V_{oc} \times I_{sc}$ where $V_{oc}$ is the open circuit voltage, $I_{sc}$ is the short circuit current, and FF is the fill factor (the value of FF can be found by computing the fraction of the total area under the I-V curve that falls within the maximum power rectangle).

For the purposes of this disclosure, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is understood that the invention is not confined to the particular embodiments set forth herein as illustrative, but embraces all such forms thereof as come within the scope of the following claims.

What is claimed is:

1. A method of forming a nanostructure on a substrate, the method comprising forming a solution comprising a dissolved metal oxide and a nanostructure growth compound, depositing a layer of the solution on the surface of the substrate, and exposing the layer to heat for a time and at a temperature sufficient to induce the growth of metal oxide nanostructures on the surface, wherein nanoparticles and nanostructures are not present in the layer of solution prior to the exposure of the layer to heat, and further wherein the nanostructure comprises at least one growth center having a plurality of projections extending radially there from along the surface of the substrate, wherein the projections are oriented parallel to and are in contact with the surface along their lengths.

2. The method of claim 1, further comprising allowing the layer to dry prior to exposing the layer to heat.

3. The method of claim 1, wherein the step of exposing the layer to heat comprises exposing the layer to visible light having sufficient intensity to increase the temperature of the layer and induce nanostructure formation.

4. The method of claim 1, wherein the metal oxide comprises ZnO.

5. The method of claim 1, wherein the nanostructure growth compound comprises an amine.

6. The method of claim 1, wherein the step of exposing the layer to heat comprises heating the layer at a temperature of about 100° C. to about 200° C.

7. The method of claim 1, wherein the substrate is an insulating substrate.

8. The method of claim 3, wherein the temperature of the layer is increased to at least 100° C.

9. The method of claim 3, wherein the visible light is focused onto the surface using a lens or a mirror.

10. The method of claim 3, wherein the source of the visible radiation is a laser.

11. The method of claim 3, wherein the entire layer is exposed in the visible light simultaneously.

12. The method of claim 3, wherein regions of the layer are exposed to the visible light non-uniformly to provide a non-uniform layer of the nanostructure on the surface.

13. The method of claim 5, wherein the nanostructure growth compound is $C_6H_{12}N_4$.

14. A method of forming a nanostructure on a substrate, the method comprising forming a solution comprising a dissolved metal oxide and a nanostructure growth compound, depositing a layer of the solution on the surface of the substrate, and exposing the layer to heat for a time and at a temperature sufficient to induce the growth of metal oxide nanostructures on the surface, wherein nanoparticles and nanostructures are not present in the layer of solution prior to the exposure of the layer to heat, further wherein the nanostructure comprises at least one growth center having a plurality of projections extending radially there from along the surface of the substrate, wherein the projections are oriented parallel to and are in contact with the surface along their lengths, and further wherein the at least one growth center has at least one projection extending radially from the at least one growth center and oriented such that an angle between the surface of the substrate and the longitudinal axis of the at least one projection is greater than zero.

15. A method of forming a nanostructure on a substrate, the method comprising forming a solution comprising a dissolved metal oxide and a nanostructure growth compound, depositing a layer of the solution on the surface of the substrate, and exposing the layer to visible light having an intensity sufficient to increase the temperature of the layer and induce the growth of metal oxide nanostructures on the surface, wherein the nanostructure comprises at least one growth center having a plurality of projections extending radially there from along the surface of the substrate, wherein the projections are oriented parallel to and are in contact with the surface along their lengths.

16. The method of claim 15, wherein the light is focused onto the surface using a lens or a mirror.

17. The method of claim 15, wherein the light source is a laser.

18. The method of claim 15, wherein the metal oxide comprises ZnO.

19. The method of claim 15, wherein the temperature of the layer is increased to at least 100° C.

20. The method of claim 15, further wherein the at least one growth center has at least one projection extending radially from the at least one growth center and oriented such that an angle between the surface of the substrate and the longitudinal axis of the at least one projection is greater than zero.

* * * * *